United States Patent
Kipping et al.

(10) Patent No.: US 8,132,306 B2
(45) Date of Patent: *Mar. 13, 2012

(54) DEVICE FOR MACHINING COMPONENTS, IN PARTICULAR OF A VEHICLE BODY

(75) Inventors: Josef Kipping, Schmelz (DE); Thomas Klemm, Heimbach (DE)

(73) Assignee: ThyssenKrupp Drauz Nothelfer GmbH, Heilbronn (DE)

(*) Notice: Subject to any disclaimer, the term of this patent is extended or adjusted under 35 U.S.C. 154(b) by 694 days.

This patent is subject to a terminal disclaimer.

(21) Appl. No.: 12/298,864

(22) PCT Filed: Apr. 30, 2007

(86) PCT No.: PCT/EP2007/054206
§ 371 (c)(1),
(2), (4) Date: Dec. 10, 2008

(87) PCT Pub. No.: WO2007/128726
PCT Pub. Date: Nov. 15, 2007

(65) Prior Publication Data
US 2009/0126178 A1    May 21, 2009

(30) Foreign Application Priority Data
May 5, 2006   (DE) .................. 10 2006 020 924

(51) Int. Cl.
B23P 23/00   (2006.01)
B23Q 39/04   (2006.01)
B23Q 5/00    (2006.01)

(52) U.S. Cl. ........... 29/38 R; 29/38 C; 29/33 P; 483/15; 483/16; 228/49.1; 228/6.1; 414/744.5; 901/15

(58) Field of Classification Search .......... 29/38 R, 29/38 C, 563, 33 P, 33 J; 483/14–16; 228/212, 228/4.1, 5.1, 6.1, 49.1; 414/744.5; 901/15
See application file for complete search history.

(56) References Cited

U.S. PATENT DOCUMENTS
5,815,902 A * 10/1998 Osterried et al. ............. 29/38 A
(Continued)

FOREIGN PATENT DOCUMENTS
CA        1307306         9/1992
(Continued)

OTHER PUBLICATIONS
Machine translation of EP 1060831, which EP '831 was published Dec. 2000.*
(Continued)

Primary Examiner — Erica E Cadugan
(74) Attorney, Agent, or Firm — Crowell & Moring LLP

(57) ABSTRACT

A device for machining components, in particular of a vehicle body has a transport and positioning unit for the component and several machining stations, which are arranged around said unit and to which the component held by a component holder of the transport and positioning unit can be fed in a position ready for machining. To transport the component from one machining station to the other machining stations while taking up the smallest possible surface area, the transport and positioning unit includes a rotor and a pivoting arm that is mounted eccentrically on said rotor, driven in opposition to the latter and supports the component holder. The drives of the rotor and the pivoting arm are synchronized in such a way that the component holder is displaced along a closed curved path comprising spaces between the neighboring apexes of said path.

9 Claims, 7 Drawing Sheets

U.S. PATENT DOCUMENTS

| | | |
|---|---|---|
| 6,366,830 B2 | 4/2002 | Bacchi et al. |
| 2003/0094742 A1 | 5/2003 | Eicher |
| 2005/0224557 A1 | 10/2005 | Kraus |
| 2008/0006675 A1 | 1/2008 | Kraus |
| 2009/0276999 A1* | 11/2009 | Kipping et al. ........... 29/650 |

FOREIGN PATENT DOCUMENTS

| | | |
|---|---|---|
| DE | 19713860 | 10/1998 |
| DE | 29817895 | 2/2000 |
| DE | 10153807 | 5/2003 |
| DE | 20211755 | 12/2003 |
| EP | 1060831 A1 * | 12/2000 |
| JP | 62222906 | 9/1987 |
| WO | 8910240 | 11/1989 |

OTHER PUBLICATIONS

International Search Report for PCT/EP2007/054206, apparently completed Jul. 2007.

* cited by examiner

DEVICE FOR MACHINING COMPONENTS, IN PARTICULAR OF A VEHICLE BODY

CROSS-REFERENCE TO RELATED APPLICATIONS

This application is a National Phase Application of International Application No. PCT/EP2007/054206, filed on Apr. 30, 2007, which claims the benefit of and priority to German Patent Application No. DE 10 2006 020 924.9-14, filed on May 5, 2006. The disclosure of the above applications are incorporated herein by reference in their entirety.

FIELD OF THE INVENTION

The invention relates to a device for machining components, in particular of a vehicle body, having a transport and positioning unit for a component and several machining stations which are disposed around this transport and positioning unit and to which the component, held by a holder of the transport and positioning unit, can be brought in a machining position.

BACKGROUND OF THE INVENTION

The machining of complex components, in particular components of a vehicle body or even whole vehicle bodies is carried out in a known manufacturing plant (DE 197 13 860 A1) such that the components to be machined are transported by suitable transport means through a plurality of machining stations of a transfer line, where the machining is effected by laterally stationary machining robots. In the machining stations the components are held on a stationary component holder in a machining position. Such manufacturing plants take up a large amount of space.

In another known device for machining components (DE 101 53 807 A1) at least one component holder is disposed in a radially displaceable manner on a rotating support. Various machining stations such as grinding, drilling, milling and turning tools are disposed about the rotational axis of the support and below the support. With the rotatably driven support and the component holder, which is mounted in a radially displaceable manner on the support, the component held thereby can be brought to the individual machining stations. In order to be able to machine it at the machining stations, it must then still be lowered by the component holder to the individual tools disposed below the support.

A device of this type is arranged only for the machining of comparatively small components owing to the rotationally driven support for the component support and the tools disposed there under. The device is not suitable for larger components such as those of vehicle bodies, owing to the tools and supports being constructed one above the other.

A transport unit is known (U.S. Pat. No. 6,366,830 B2) for transporting components, in particular wafers, from a storage location to a machining station and back to the storage location or to another storage location, which transport unit consists of a two-armed rotor and a pivoting arm which is eccentrically mounted on each rotor arm and is mounted to rotate about an axis in parallel with the rotor axis, and of further gripper arms which can pivot on the free ends of the pivoting arms about an axis in parallel with the rotor axis. Pivotably mounted, driven grippers are disposed on these gripper arms. The rotational/pivoting drives of the rotor, pivoting arms and grippers are coordinated by a control unit in such a way that the grippers can reach different locations, in particular the storage locations and the machining stations of the wafer. The prior art does not mention whether the path followed by the wafer is formed so as to save space.

In the case of a device of the type mentioned in the introduction, which is well-known from practice, the transport and positioning unit is formed as a rotary table with at least one component support disposed in a stationary manner thereon at its periphery. When the rotary table rotates, the component holder is moved in a circle to the machining stations disposed outside this circle. A device of this type requires a large amount of space and can rarely be adapted to pre-existing spaces.

SUMMARY OF THE INVENTION

In general, an aspect of the invention is to create a device for machining components, in particular of vehicle bodies, of the type mentioned in the introduction, of which the transport and positioning unit for transporting the components from one machining station to the next machining station requires as little space as possible.

In an embodiment, this aspect is achieved by a device having a transport and positioning unit including a rotor and a pivoting arm which is mounted eccentrically thereon, driven in opposition to the rotor about an axis in parallel with the rotor axis and supports the component holder, wherein the rotational movements of the rotor and pivoting arm are tailored to each other in such a way that the component holder follows a closed curved path comprising apexes, wherein spaces remain between its neighboring apexes, which spaces are not passed over by the component holder.

With the invention the requirement for surface area is limited to a minimum because the component holder with the component does not circulate in a circle but on a special curved path with apexes. It reaches the maximum radial position in the machining stations lying at the apexes, while in the regions lying there between it is displaced radially inwards so that spaces are produced which can serve for the placement of machining robots, tool stores and other devices. The possible optimal placing of the transport and positioning units also creates sufficient free surface and travel surface for moveable transport units such as forklift trucks, with which machining robots or other devices positioned between the transport and positioning units can be reached and transported away. The remaining spaces mean that a manufacturing plant in accordance with the invention comprising transport and positioning units can also be optimally adapted to the local conditions at the place where it is installed. Thus the transport and positioning unit can be placed between columns of a building, e.g. a factory building, wherein the columns are then located in the spaces. The particular curved paths with apexes, e.g. cycloids and ellipses, have the advantage that the component holder is moved on the path sections between the apexes at a comparatively fast path speed, while in the region of the apexes it moves at the lowest path speed so that in this case it can easily be brought to a standstill as required for machining and can be made to move again after machining.

The pivoting arm can be formed as a double armed device in order to support a tool, e.g. a tip dresser, on its supporting arm opposite the other arm with the component holder, with which tip dresser the electrodes of a welding tool of a machining robot can be machined for the component to be welded.

In order to machine the component in the machining stations it is important that the component holder holds the component as precisely as possible in the machining position, because otherwise a tool of a machining robot cannot precisely reach the points to be machined. This requirement can be achieved in one embodiment of the invention with relatively simple means in that centering units for the component holder are provided in the machining stations. These centering units are formed in such a way that they position the component holder in the correct position by supporting it vertically and laterally.

The component holder can be exchanged in order to be able to machine different components with the device in accordance with the invention. In order to change a component holder in such a way the device has a store above the transport and positioning unit which holds in readiness different types of component holders in assigned positions on the circulating path of the component holder, in particular at its apexes, where with at least one changing device a component holder supported by the pivoting arm can be exchanged for a component holder carried by the store. The changing device can be a machining robot with a suitable gripper or a special lifting unit of the store. In any case with this space-saving embodiment of the invention the component holders can be changed quickly.

The mutually tailored rotational movements of the rotor and pivoting arm can be achieved by different means. Thus the robot and pivoting arm each have their own rotary drive. However, a common drive is preferably provided. It is particularly advantageous if the rotor and the pivoting arm are coupled to each other in terms of transmission technology by means of a wheel gear. The wheels can be coupled to each other by toothing, friction or belts. Thus a wheel gear can consist of a toothed crown held in a non-rotational manner on a stationary base of the rotor, an intermediate wheel meshing with the toothed crown and rotatably mounted on the rotor and a drive wheel of the pivoting arm meshing with the intermediate wheel. The desired curved path can be determined by means of the transmission ratio (number of teeth) of these toothed wheels and the axial spacing of the rotational axes of the rotor and pivoting arm, and the length of the lever arm of the pivoting arm.

The supply of power and control commands to the transport and positioning unit is preferably effected from above the transport and positioning unit via a rotary distributor disposed on the rotational axis of the pivoting arm. For the supply lines for power and control commands a line tree can be connected, via the rotary distributor in the manner of a connecting rod, to a source centrally disposed in the axis of the rotor.

If machining using lasers is also to be carried out the device can be fitted with radiation protection means. In accordance with a further embodiment of the invention this radiation protection means can be produced by housing the transport and positioning unit in a cabinet with lock gates at the working stations. A cabinet of this type takes up little space since the component support is moved forwards radially a great extent with respect to the lock gates, which are to be opened for the shielded machining robot, only to receive and machine the component, while it is transported between the lock gates on the space-saving curve sections between the apexes.

The device in accordance with the invention is especially suitable for a combination of a plurality of, in particular, similar transport and positioning units, wherein "similar" is to be understood to mean not necessarily identical curved paths but only closed curved paths with apexes. In this respect according to one embodiment of the invention, in addition to the one transport and positioning unit, at least one further similar transport and positioning unit is provided, with which a component held by the component holder of one transport and positioning unit can be brought in a machining position at least to the proximity of a machining station of the other transport and positioning unit. With this embodiment and by using a minimum of space it is possible to carry out different machining operations successively or simultaneously at the same machining station or in the proximity thereof by a machining robot or a plurality of machining robots. While a component is held by the one transport and positioning unit in the machining position at a first machining station, the other transport and positioning unit holds another component at another machining station in a machining position so that there are no collisions. If the first component is then cleared from the first machining station, the other component can be moved from the other machining station into the first machining station. The first machining station can also be reached by two machining robots which carry out their machining operations successively or simultaneously on the component supplied. In this way it is achieved that, while requiring only a small amount of space and a short machining time, machining operations can be carried out at different machining stations simultaneously and at the same machining station one after another or simultaneously.

Since the transport and positioning unit in accordance with the invention can be arranged for different curved paths, positioning units with different curved paths and machining and/or transport robots disposed there between can be combined to form a space-saving manufacturing plant. In some cases it may be useful also to supplement and/or combine such a manufacturing plant with conventional component holder-supporting rotary tables.

DESCRIPTION OF THE DRAWINGS

The invention will be explained in more detail hereinunder with the aid of a drawing schematically illustrating an exemplified embodiment in which.

DESCRIPTION

Figure 1:
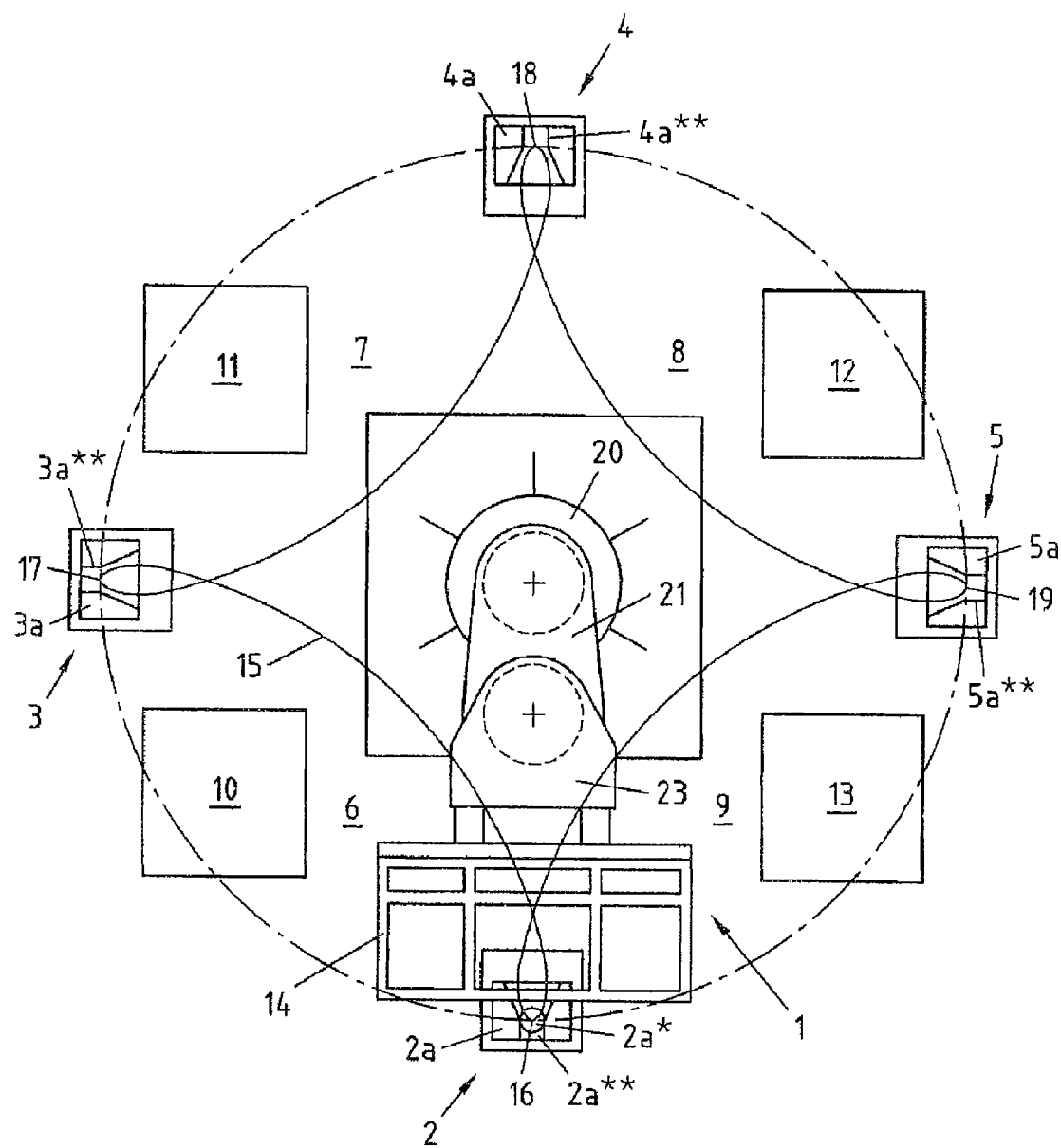
FIG. 1 illustrates a plan view of a device for machining components with a transport and positioning unit and a plurality of machining stations and a plurality of spaces for machining robots.

According to FIG. 1 the device for machining components, in particular of a vehicle body, comprises a transport and positioning unit 1 having a plurality of machining stations 2, 3, 4, 5 disposed around this transport and positioning unit 1. Between the machining stations 2, 3, 4, 5 there are spaces 6, 7, 8, 9 which can be used for different purposes, in particular for the placement of machining robots, tool stores, etc. The device can also be placed in such a way that the supporting columns of a factory building are located in the spaces 6, 7, 8, 9. Thus optimal adaptation to the local conditions can be achieved. In the exemplified embodiment of FIG. 1 the spaces 6, 7 are used for the placement of machining robots 10, 11, 12, 13 illustrated only schematically as boxes.

The transport and positioning unit 1 has an exchangeable component holder 14, e.g. a known clamping frame for the component to be machined, not shown. This component holder 14 is moved by the transport and positioning unit 1 on a cycloid curved path 15 with apexes 16, 17, 18, 19 to the machining stations 2, 3, 4, 5. In the apexes 16, 17, 18, 19 the component holder 14, and therefore also the held component, is held in a position suitable for machining by at least one of the neighboring machining robots 10, 11, 12, 13. When the component holder 14 is in the position illustrated in FIG. 1 both the machining robot 10 and also the machining robot 13 can effect machining on the component. The particular curved path 15 imposes the prerequisite that the device with the transport and positioning unit 1 and machining robots 10, 11, 12, 13 is very compact and thus takes up the smallest possible surface area.

Figure 2:
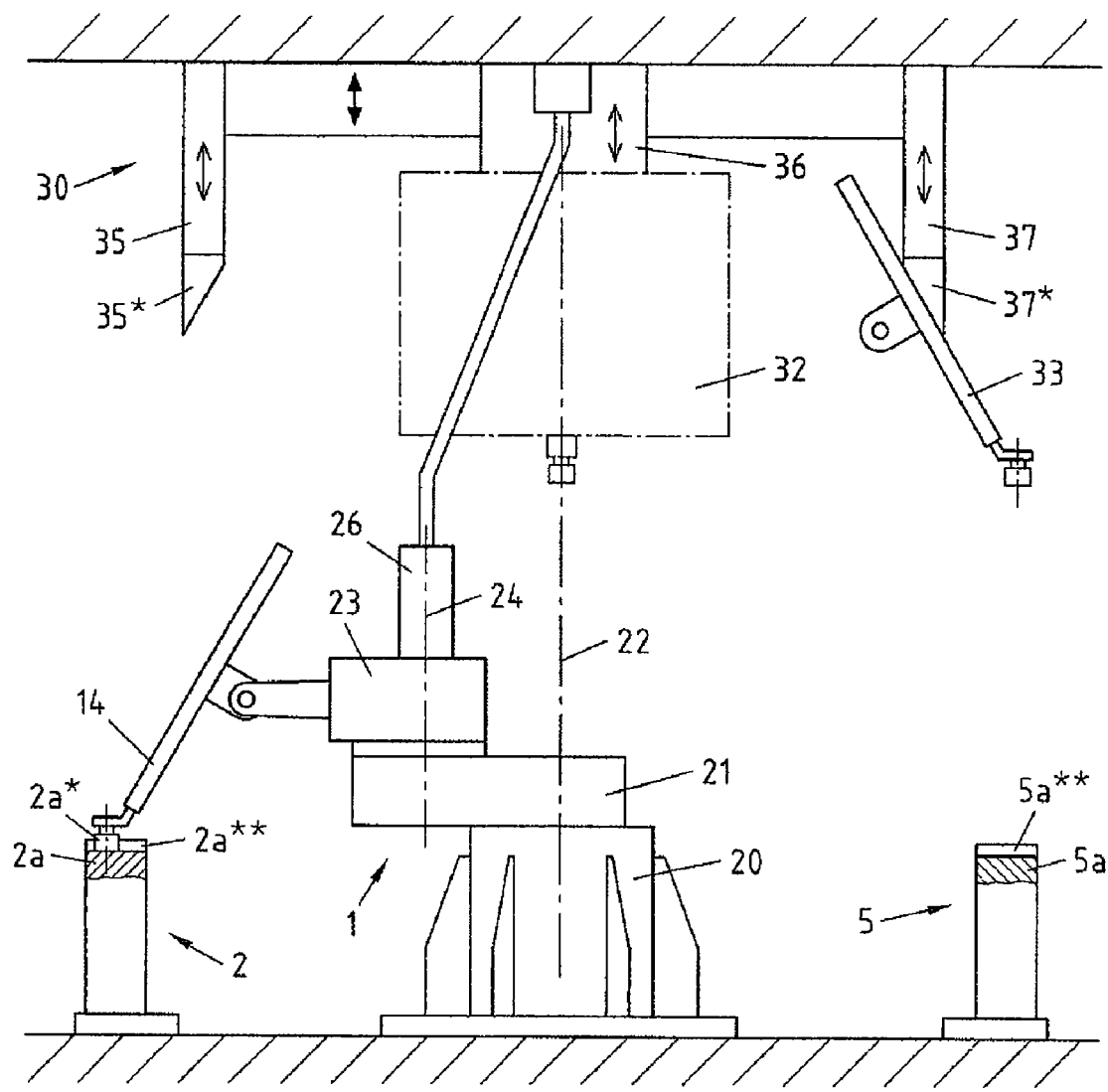
FIG. 2 illustrates a side view of a transport and positioning unit of the device in accordance with FIG. 1, FIG. 3a-c illustrate the transport and positioning unit in accordance with FIG. 1 in different phases of repositioning from a first machining station to a second machining station offset by 90.degree. with respect thereto in the case of a cycloid curved path with four apexes.
Figure 3A:
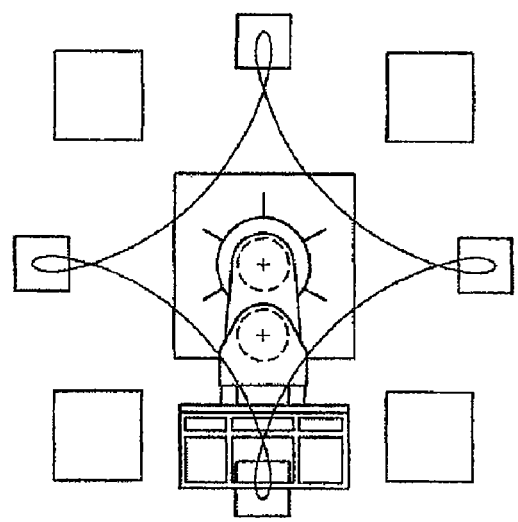
Figure 3B:
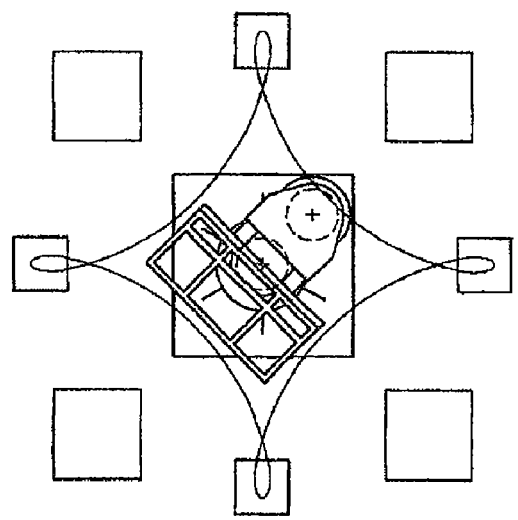
Figure 3C:
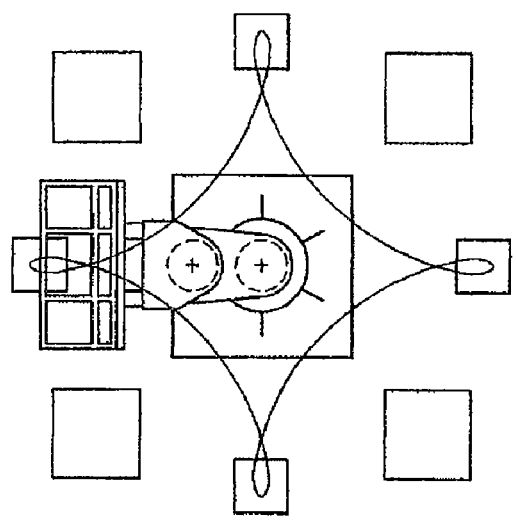
Figure 4A:
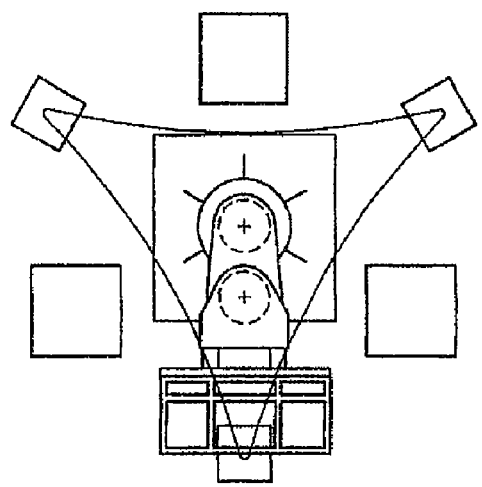
FIG. 4a-c illustrate the transport and positioning unit in accordance with FIG. 1 in different phases of repositioning from a first machining station to a second machining station offset by 120° with respect thereto in the case of a cycloid curved path with three apexes.
Figure 4B:
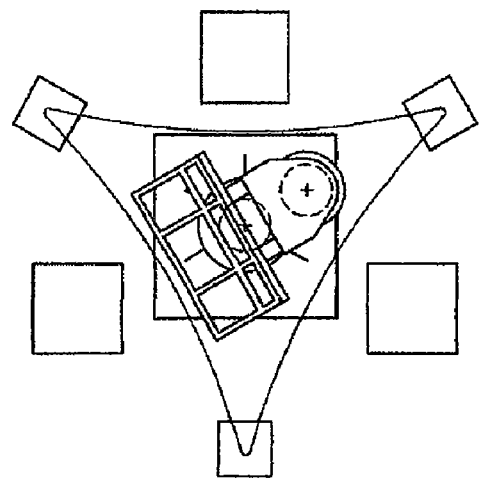
Figure 4C:
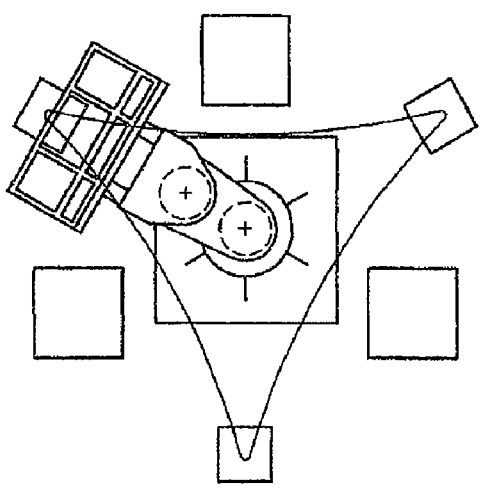
Figure 5A:
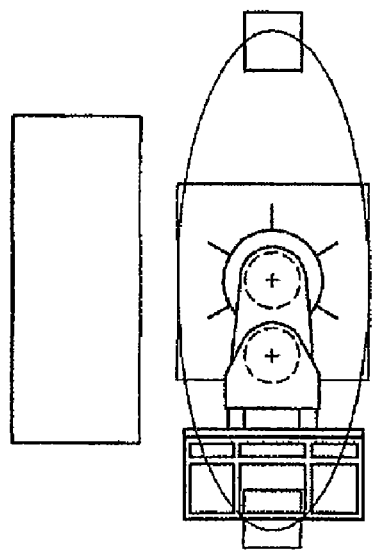
FIG. 5a-d illustrate the transport and positioning unit in accordance with FIG. 1 in different phases of repositioning from a first machining station to a second machining station offset by 180° with respect thereto in the case of a elliptical curved path with two apexes.
Figure 5B:
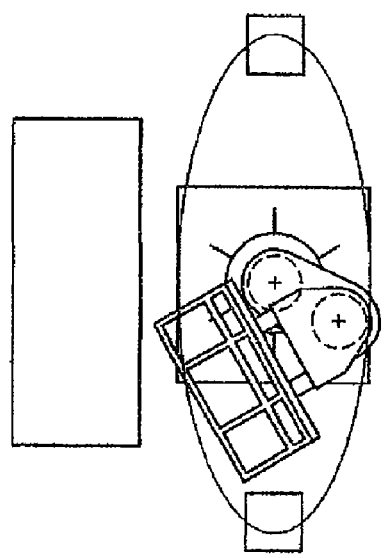
Figure 5C:
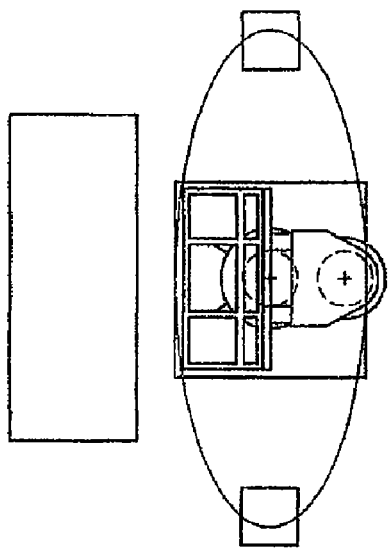
Figure 5D:
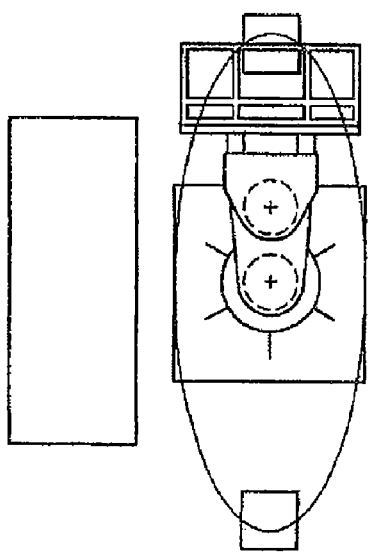

The described cycloid curved path 15 with four apexes 16, 17, 18, 19 in accordance with FIG. 1 or 3a-c, but also other cycloid curved paths with a different number of apexes in accordance with FIG. 4a-c or an elliptical curved path in accordance with FIG. 5a-d, are produced in the case of the exemplified embodiment of the invention with a particular construction and gear mechanism for the transport and positioning unit. As shown in FIG. 2 the transport and positioning unit 1 on a stationary base 20 has a rotor 21 with a rotary drive, not shown in detail. On the rotor 21a pivoting arm 23 is mounted eccentrically with respect to the rotor axis 22 thereof so as to be able to rotate about an axis 24 in parallel with the rotor axis 22. The pivoting arm 23 is drivingly coupled to the rotor 22 via a wheel gear in such a manner that the rotor 22 and pivoting arm 23 rotate in opposite directions. In this way, e.g. on the base 20, an externally toothed toothed crown is held in a non-rotational manner and is engaged with the intermediate toothed wheel supported by the rotor 22. The intermediate toothed wheel meshes with a driven toothed wheel which is rotatably mounted at the free end of the rotor 22 and is connected in a non-rotatable manner to a drive shaft of the pivoting arm 23. The ratio of the number of teeth on the different toothed wheels and the effective lever arm lengths of the rotor 22 and pivoting arm 23 enable the desired different path curves to be produced, of which FIGS. 3a to 5d show three characteristic examples.

In an exchangeable manner at its free end the pivoting arm 23 supports a component holder 14, in particular a clamping frame, with which the component to be machined can be held in a precisely preset machining position. In order to support the positioning in this location a respective centering unit 2a, 3a, 4a, 5a can be provided in the machining stations 2, 3, 4, 5 and consists of a vertically mounted support wheel 2a* on the pivoting arm 23 or component holder 14 and a stationary connecting link guide 2a, 3a, 4a, 5a, into which the support wheel 2a* runs during the substantially radial movement of the component holder 14.

On the pivoting arm 23 a rotary distributor 26 for supplying power and control commands is disposed in the rotational axis 24 thereof and is connected to a stationary connection point 25 on the factory ceiling.

On the factory ceiling a star-shaped, in particular, cross-shaped, store 30 for a plurality of different types of component holder 32, 33 with lifting units 35, 36, 37 is held such that at the machining stations 2, 3, 4, 5 the component holder 14 can be brought into a position suitable for the exchange by means of the associated lifting unit 35, 36, 37. This means that the component holder which is no longer required is first passed over to the empty lifting unit and then, after relative rotation of the store 30 and transport and positioning unit, the new component holder is passed over from the store to the transport and positioning unit. The exchange itself is effected by the transport and positioning unit, possibly also with a machining robot.

By way of example FIGS. 3a-c, 4a-c and 5a-d show different characteristic curved paths for transport and positioning units which are arranged differently in terms of transmission technology, on which curved paths the component holder of the transport and positioning unit is moved from one machining station to the next. In all cases the relationship: sum of the angles–timing angle=intrinsic rotary angle of the rotor applies, wherein the sum of the angles=360°, the timing angle of the angles between the neighboring machining stations=the angle of the intrinsic rotation of the component holder between the neighboring machining stations, and the intrinsic rotary angle of the rotor is the angle of the rotor between the neighboring machining stations.

Figure 6:
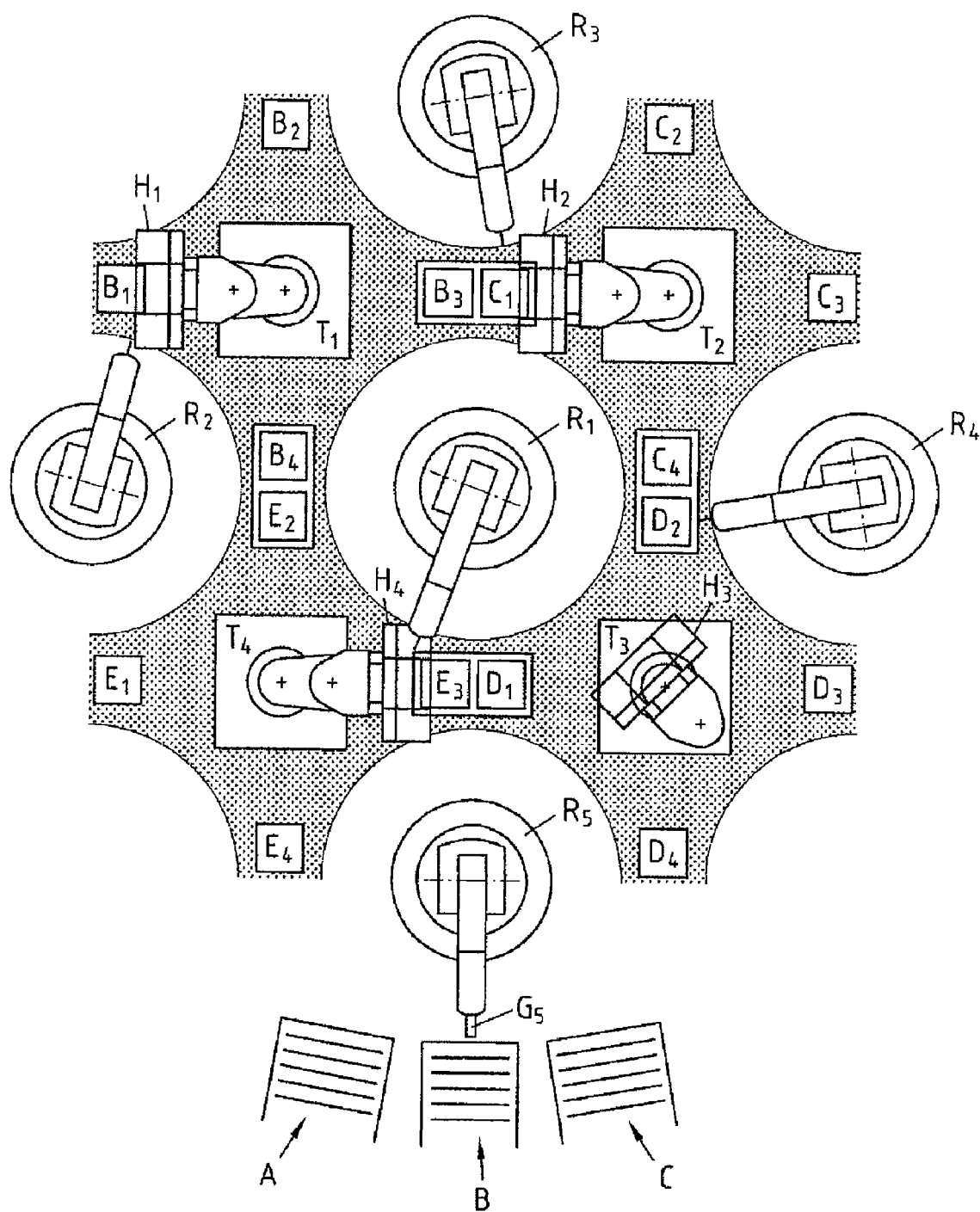
FIG. 6 illustrates a plan view of a manufacturing plant with a plurality of transport and positioning units in accordance with FIG. 1 and machining and/or transport robots disposed therebetween and FIG. 7 illustrates the machining and transportation of a component in neighboring machining stations.

Devices for machining components with the same and/or different transport and positioning units of the type in accordance with the invention can be combined with each other but also with those of a conventional type such as e.g. rotary tables, and with machining and/or transport robots disposed between them to form a space-saving manufacturing plant as shown in FIG. 6. A manufacturing plant such as this can be combined with similar or other manufacturing plants to form an even larger plant.

In the manufacturing plant shown in FIG. 6 four transport and positioning units $T_1$, $T_2$, $T_3$, $T_4$ are disposed in a grid pattern. Four machining stations $B_1$, $B_2$, $B_3$, $B_4$ are disposed around the transport and positioning unit $T_1$. In a corresponding manner four machining stations $C_1$, $C_2$, $C_3$, $C_4$ are disposed around the transport and positioning unit $T_2$, wherein the machining station $B_3$ of the first transport and positioning unit $T_1$ is disposed to cover the same area as, or is disposed in the proximity of, the machining station $C_1$ of the second transport and positioning unit $T_2$, which is shown schematically in the drawing by the common frame. In a corresponding manner, the further transport and positioning units $T_3$, $T_4$ are allocated machining stations $D_1$, $D_2$, $D_3$, $D_4$ and $E_1$, $E_2$, $E_3$, $E_4$, respectively wherein the machining stations $C_4$, $D_2$ on the one hand and $D_1$, $E_3$ on the other hand and also $B_4$, $E_2$ are disposed to cover the same area or are disposed close by each other. The component holders $H_1$, $H_2$, $H_3$, $H_4$ of the individual transport and positioning units $T_1$, $T_2$, $T_3$, $T_4$ with their drives pass over the shaded area. In spaces not passed over by the component holders $H_1$, $H_2$, $H_3$, $H_4$ machining and/or transport robots $R_1$, $R_2$, $R_3$, $R_4$, $R_5$ are positioned. Provided that a machining and/or transport robot is disposed centrally between transport and positioning units $T_1$, $T_2$, $T_3$, $T_4$, as is the case in the exemplified embodiment for the transport and machining robot $R_1$, this robot can carry out machining at eight machining stations $B_3$, $C_1$, $C_4$, $D_2$, $D_1$, $E_3$, $E_2$, $B_4$, which are allocated to different transport and positioning units $T_1$, $T_2$, $T_3$, $T_4$, wherein the respective directly adjacent machining stations $B_3$, $C_1$ and $C_4$, $D_2$ and $D_1$, $E_3$ and $E_2$, $B_4$, can also cover the same area but be operated by different transport and positioning units $T_1$, $T_2$, $T_3$, $T_4$. In contrast, the outer transport and machining robots $R_2$, $R_3$, $R_4$, $R_5$ can carry out machining only at the four machining stations facing them, e.g., the robot $R_3$ only at the machining stations $B_2$, $B_3$, $C_1$, $C_2$ unless a further similar manufacturing plant, not shown in FIG. 6, is adjoined to the illustrated manufacturing plant.

While each transport and positioning unit serves only to receive the workpiece to be machined and to hold it in a machining position in order to be machined by the tool of the transport and/or machining robot, the transport and/or machining robot serves, as the term suggests, to carry out machining operations on the component and to transport the component within the manufacturing plant, as well for transportation or machining alone. Each transport and positioning unit is therefore fitted with a component holder which can be exchanged and which is matched to the component to be machined, while the machining and/or transport robot can be fitted with tools and/or holders/grippers for the components.

Figure 7:
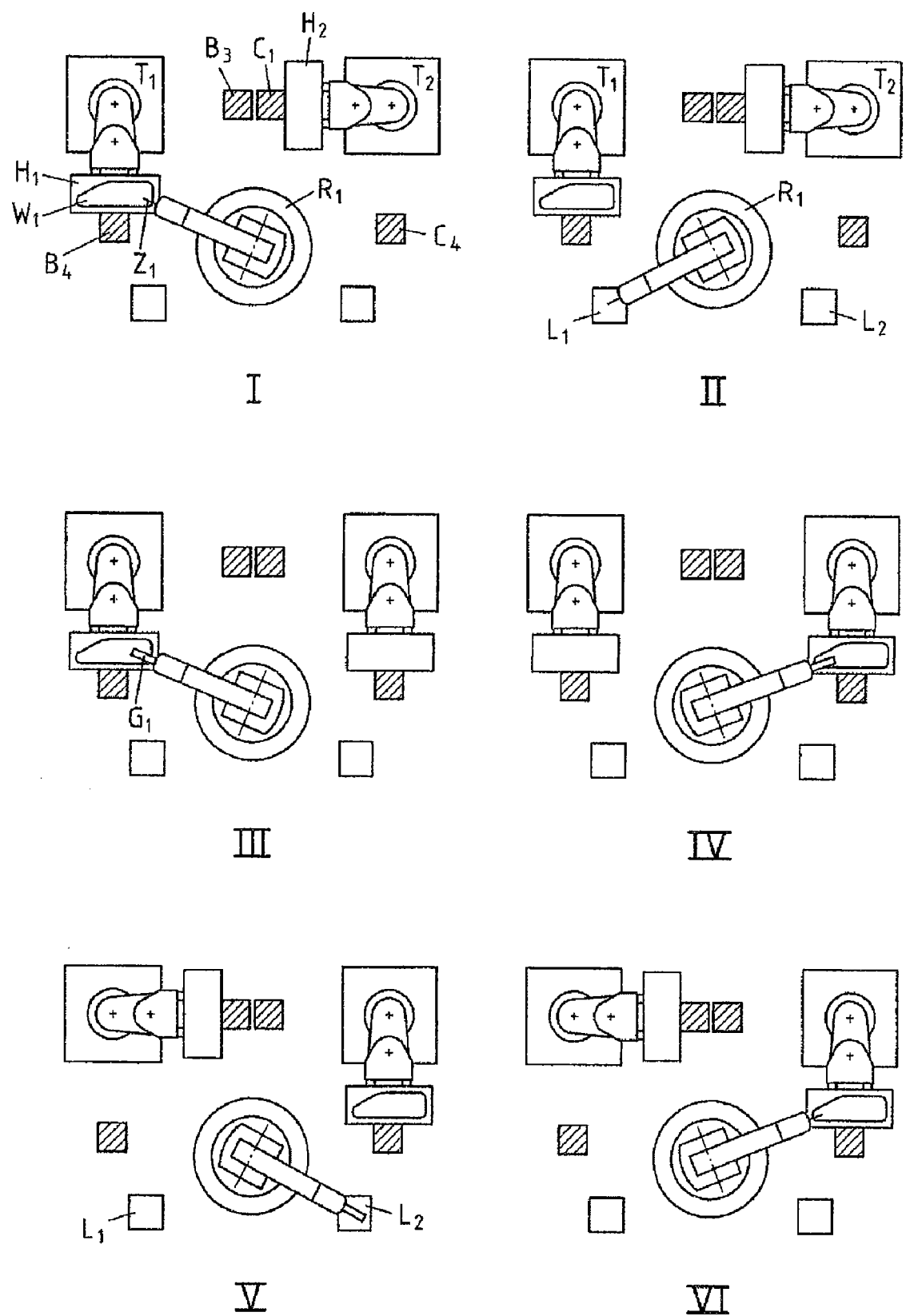

FIG. 7 shows how a component $W_1$ to be machined is transported by the transport and positioning unit $T_1$ to the next transport and positioning unit $T_2$ and is machined at the individual machining stations. In phase I the component $W_1$ held by the holder $H_1$ of the first transport and positioning unit $T_1$ in a machining position at the first machining station $B_4$ is machined by the machining robot $R_1$ fitted with a tool $Z_1$, e.g. welding tongs. After this machining operation, in phase II, the tool $Z_1$ of the machining robot $R_1$ is changed. The tool $Z_1$ is placed at the storage location $L_1$ and exchanged for a gripper $G_1$ placed at the storage location $L_2$. In phase III the machining robot $R_1$ passes the component $W_1$ to the second transport and positioning unit $T_2$. In phase IV the component holder $H_2$ thereof holds the tool $W_1$ at the further machining station $C_4$ in a machining position in order to undergo further machining. In phase V a further tool exchange takes place, in particular from the gripper $G_1$ to the tool $Z_1$. In phase VI further machining, e.g. welding, is carried out on the component $W_1$ by means of the machining robot $R_1$. In the described phase sequence of machining operations and transportation only the machining stations $B_4$, $C_4$ have been used. It will be understood that machining stations $B_3$, $C_1$ disposed in a closely adjacent manner between the transport and positioning units $T_1$, $T_2$ could also have been operated by the machining and transport robot $R_1$. This means that each machining and transport robot $R_1$ can operate two machining stations $B_1$, $B_3$ or $B_2$, $B_4$ of each transport and positioning unit $T_1$, $T_2$ lying within its operational area, i.e. if it is disposed centrally it can operate eight, and if it is disposed at the edge of a plant it can operate four machining stations.

The flow of components through the described manufacturing plant can vary. It depends on the component and the machining operations. FIG. 6 shows stores A, B, C with different types of components. In a first case the machining and transport robot $R_5$ receives with a suitable gripper $G_5$ a component from the store A and a further component from the store B and passes them to the component holder $H_4$ of the transport and positioning unit $T_4$ which firmly clamps the components for machining and transports them to one or a plurality of the allocated machining stations and holds them there in a machining position. After machining is completed it is passed further from one of the machining and transport robots $R_1$, $R_2$ to the next transport and positioning unit $T_1$ where it is machined further at the allocated machining stations. Finally, it is taken by the machining and transport robot $R_3$ and conveyed out of the manufacturing plant or sent to further transport and positioning units.

Other combinations of components can take a further path through the manufacturing plant in order to be able to carry out other or additional machining operations on the components. Thus the machining and transport robot $R_5$ can use a suitable gripper to remove components from the stores A, B, C for machining. The machining and transport robot $R_5$ first passes the component(s) to the component holder $H_4$ of the transport and positioning unit $T_4$. The component(s) is/are then passed to the transport and positioning unit $T_3$ by one of the machining and transport robots $R_1$, $R_5$. It then travels further via the transport and positioning unit $T_2$ to the transport and positioning unit $T_1$ from where it then travels further in the same manner as the components removed from the stores A and B. Thus different machining programmes can be carried out using one and the same manufacturing plant.

The invention claimed is:

1. Device for machining components, having a first transport and positioning unit for a component and plural machining stations which are disposed around first transport and positioning unit, wherein the component, held by a component holder of the first transport and positioning unit, can be brought to the plural machining stations in a machining position, the first transport and positioning unit having a rotor and a pivoting arm which is mounted eccentrically thereon, driven in opposition to the rotor about a rotational axis in parallel with a rotor rotational axis and which pivoting arm supports the component holder, wherein the rotational movements of the rotor and pivoting arm are tailored to each other in such a way that the component holder follows a closed curved path comprising apexes, wherein spaces remain between respective neighboring apexes, which spaces are not passed over by the component holder.

2. Device as claimed in claim 1, wherein in the machining stations, centering units are provided for the component holder.

3. Device as claimed in claim 1, wherein above the first transport and positioning unit is a store which holds in readiness different types of component holders in assigned positions on the closed curved path, where with at least one changing device, a component holder supported by the pivoting arm can be exchanged for a different type of component holder carried by the store.

4. Device a claimed in claim 1, wherein supply of power and control commands to the first transport and positioning unit is effected from above the first transport and positioning unit via a rotary distributor disposed on the pivoting arm in the rotational axis thereof.

5. Device as claimed in claim 1, wherein in addition to the first transport and positioning unit, at least one second transport and positioning unit is provided, with which a component held by a component holder of one of the at least one second transport and positioning units can be brought in a machining position at least to the proximity of a machining station of the first transport and positioning unit.

6. Device as claimed in claim 5, wherein the first and the at least one second transport and positioning units and machining and/or transport robots form a manufacturing plant.

7. Device as claimed in claim 1, wherein the closed curved path of the component holder is an ellipse.

8. Device as claimed in claim 1, wherein the closed curved path is a hypocycloid with three apexes.

9. Device as claimed in claim 1, wherein the closed curved path is an astroid with four apexes.

* * * * *